US011496992B2

(12) United States Patent
Modarres Razavi et al.

(10) Patent No.: US 11,496,992 B2
(45) Date of Patent: *Nov. 8, 2022

(54) CONDITIONAL TERMINATION OF RSTD MEASUREMENTS

(71) Applicant: Telefonaktiebolaget LM Ericsson (publ), Stockholm (SE)

(72) Inventors: Sara Modarres Razavi, Linköping (SE); Johan Bergman, Stockholm (SE); Åke Busin, Sollentuna (SE); Fredrik Gunnarsson, Linköping (SE); Olof Liberg, Stockholm (SE); Xingqin Lin, Santa Clara, CA (US); Henrik Rydèn, Solna (SE); Yutao Sui, Solna (SE); Martin Van Der Zee, Malmö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 23 days.

This patent is subject to a terminal disclaimer.

(21) Appl. No.: 17/060,239

(22) Filed: Oct. 1, 2020

(65) Prior Publication Data

US 2021/0022106 A1   Jan. 21, 2021

Related U.S. Application Data

(63) Continuation of application No. 16/347,250, filed as application No. PCT/IB2017/056885 on Nov. 3, 2017, now Pat. No. 10,798,674.

(Continued)

(51) Int. Cl.
*H04W 64/00* (2009.01)
*G01S 5/02* (2010.01)
(Continued)

(52) U.S. Cl.
CPC ......... *H04W 64/006* (2013.01); *G01S 5/0221* (2013.01); *G01S 5/0236* (2013.01);
(Continued)

(58) Field of Classification Search
CPC ............... H04W 64/006; H04W 24/10; H04W 64/00; G01S 5/0221; G01S 5/0236; G01S 5/10; H04M 1/724; H04M 1/72403
See application file for complete search history.

(56) References Cited

U.S. PATENT DOCUMENTS

| 2007/0161379 | A1 | 7/2007 | Morisaki |
| 2011/0039577 | A1* | 2/2011 | Stern-Berkowitz ....... G01S 5/10 455/456.1 |

(Continued)

FOREIGN PATENT DOCUMENTS

| CN | 101610521 A | 12/2009 |
| CN | 103458446 A | 12/2013 |

(Continued)

OTHER PUBLICATIONS

3GPP TSG-RAN WG4 Meeting #58; Taipei, Taiwan; Source: Alcatel-Lucent; Title: Inter-frequency RSTD Measurements (R4-110906)—Feb. 21-25, 2011.

(Continued)

*Primary Examiner* — Umair Ahsan
(74) *Attorney, Agent, or Firm* — Baker Botts, LLP

(57) ABSTRACT

Methods and device for use in a wireless device of reporting positioning measurements comprises receiving network assistance information from a network node. The network assistance information is for assisting the wireless device in performing Observed Time Difference Of Arrival (OTDOA), and comprises: a list of reference cells; a list of neighbor cells; and a rule for terminating Reference Signal Time Difference (RSTD) measurements. The method further (Continued)

500

512: Send a pre-defined/conditional rule for measurement termination together with other OTDOA assistance information including the list of reference and neighbor cells to the device.

514: Receive a set of RSTD measurements and their quality from the device.

comprises performing RSTD measurement between a cell in the reference cell list and a cell in the neighbor cell list. Upon determining the RSTD measurement satisfies the rule for terminating RSTD measurements, the method includes reporting the RSTD measurements to the network node. Upon determining the RSTD measurement does not satisfy the rule for terminating RSTD measurements, performing another RSTD measurement between the cell in the reference cell list and a cell in the neighbor cell list.

10 Claims, 8 Drawing Sheets

Related U.S. Application Data

(60) Provisional application No. 62/417,962, filed on Nov. 4, 2016.

(51) Int. Cl.
  *G01S 5/10* (2006.01)
  *H04W 24/10* (2009.01)
  *H04M 1/724* (2021.01)
  *H04M 1/72403* (2021.01)

(52) U.S. Cl.
  CPC ............... *G01S 5/10* (2013.01); *H04W 24/10* (2013.01); *H04W 64/00* (2013.01); *H04M 1/724* (2021.01); *H04M 1/72403* (2021.01)

(56) References Cited

U.S. PATENT DOCUMENTS

| | | | |
|---|---|---|---|
| 2011/0205914 A1 | 8/2011 | Krishnamurthy | |
| 2012/0315890 A1* | 12/2012 | Suzuki | H04W 24/10 455/422.1 |
| 2013/0260793 A1 | 10/2013 | Lim | |
| 2014/0198680 A1 | 7/2014 | Siomina | |
| 2015/0215107 A1 | 7/2015 | Siomina et al. | |
| 2015/0257121 A1 | 9/2015 | Siomina | |
| 2015/0296359 A1 | 10/2015 | Edge | |
| 2015/0365790 A1 | 12/2015 | Edge | |
| 2016/0248563 A1 | 8/2016 | Behravan | |
| 2017/0171857 A1* | 6/2017 | Lee | G01S 5/0273 |
| 2017/0289831 A1 | 10/2017 | Park | |
| 2018/0270784 A1* | 9/2018 | Lee | H04W 64/00 |

FOREIGN PATENT DOCUMENTS

| | | |
|---|---|---|
| CN | 103686992 A | 3/2014 |
| EP | 2 523 496 A1 | 11/2012 |
| RU | 2012139962 A | 3/2014 |
| WO | 00 60371 A1 | 10/2000 |
| WO | 2016 022051 A1 | 2/2016 |
| WO | WO2016032293 A3 | 3/2016 |
| WO | WO2016126120 A1 | 8/2016 |

OTHER PUBLICATIONS

PCT International Search Report for International application No. PCT/IB2017/056885—dated Jan. 24, 2018.
PCT Written Opinion of the International Searching Authority for International application No. PCT/IB2017/056885—dated Jan. 24, 2018.
Letter from Russian Associate explaining in English, the Russian Decision on Grant regarding PCT/IB2017/056885, Ref 2420-556649RU, Appl. No. 20191171135. dated Mar. 12, 2020.
Russian Patent Office, Decision on Grant dated Feb. 9, 2020 regarding Appl. No. 20191171135; English Abstract attached.
Russian Patent Office, Search Report, dated Feb. 13, 2020 regarding Appl. No. 20191171135.
3GPP TSG-RAN WG4, Meeting #58 (R4-110906), Taipei, Taiwan, Title: Inter-frequency RSTD Measurements, https://www.3gpp.org/ftp/tsg_ran/WG4_Radio/TSGR4_58/Docs/; dated Feb. 16, 2011.
European Patent Office Examination Report in Application No. 17 808 157.6-1231 dated Jan. 27, 2022.
European Patent Office Examination Report in Application No. 17 808157.6-1231 dated Mar. 24, 2021.
European Patent Office Examination Report in Application No. 17 808 157.6-1231 dated Jul. 13, 2020.
China Patent Office, Office Action in Application No. 2017800823617 dated Aug. 5, 2020 (not translated).
Intellectual Property Office of India Patent Office, Examination Report in Application No. 201947017760 dated Jan. 6, 2021.
ETSI TS 136 355, v3.2.0, LTE; Evolved Universal Terrestrial Radio Access (E-UTRA); LTE Positioning Protocol (LPP) (G300 TS 36.355 version 13.20.0 Release 13), Oct. 2016.
Ericsson, "On OTDOA framework for NB-IoT", 3GPP TSG-RAN1 Meeting #87, R1-1612795, Reno, Nevada, Nov. 14-18, 2016.

\* cited by examiner

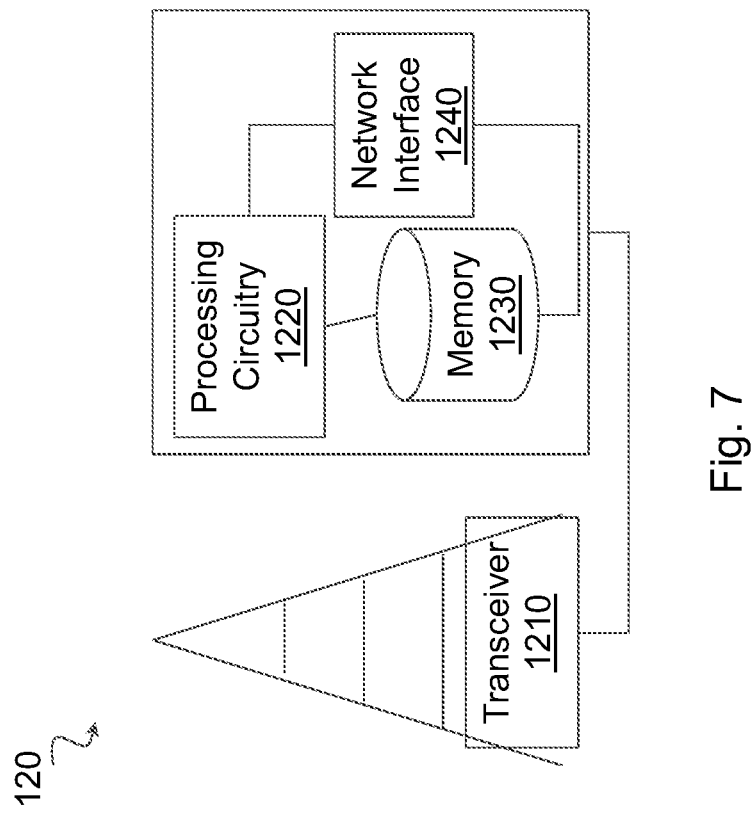

CONDITIONAL TERMINATION OF RSTD MEASUREMENTS

PRIORITY

This application is a continuation, under 35 U.S.C. § 120 of U.S. patent application Ser. No. 16/347,250 filed on May 3, 2019, which is a U.S. National Stage Filing under 35 U.S.C. § 371 of International Patent Application Serial No. PCT/IB2017/56885 filed Nov. 3, 2017 and entitled "Conditional Termination of RSTD Measurements" which claims priority to U.S. Provisional Patent Application No. 62/417, 962 filed Nov. 4, 2016 both of which are hereby incorporated by reference in their entirety.

TECHNICAL FIELD

Certain embodiments of the present disclosure relate, in general, to wireless communications and, more particularly, to conditional termination of reference signal time difference (RSTD) measurements. Certain embodiments may relate to the technology areas of Internet of Things (IoT), Narrowband IoT (NB-IoT), Machine-Type Communications (MTC), Reference Signal Time Difference, Observed Time Difference of Arrival (OTDOA), and/or other suitable technology areas.

INTRODUCTION

The Internet of Things (IoT) is a vision for the future world where everything that can benefit from a connection will be connected. Cellular technologies are being developed or evolved to play an indispensable role in the IoT world, particularly the machine type communication (MTC). MTC is characterized by lower demands on data rates than, for example, mobile broadband, but with higher requirements on, for example, low cost device design, better coverage, and an ability to operate for years on batteries without charging or replacing the batteries. To meet the IoT design objectives, the Third Generation Partnership Project (3GPP) has standardized Narrowband IoT (NB-IoT) in long term evolution (LTE) Release 13 to include a system bandwidth of 180 kHz and targets improved coverage, long battery life, low complexity communication design, and network capacity that is sufficient for supporting a massive number of devices.

To further increase the market impact of further enhanced MTC and NB-IoT, improving narrowband support for positioning can be a key aspect of both of these devices in Release 14. The enhancements will maintain the ultra-low cost and complexity of these UE where appropriate, as well as the coverage and capacity of the network.

LTE Release 13 also includes UE category M1, which addresses more demanding MTC applications. UE category M1 is associated with a maximum channel bandwidth of 6 physical resource blocks (PRBs) (corresponding to 1.08 MHz excluding guard bands or 1.4 MHz including guard bands), which can be compared to 1 PRB for NB-IoT UEs or 100 PRBs for higher LTE UE categories. Furthermore, 3GPP includes a LTE Release 14 work item on further enhanced MTC (FeMTC), where a UE type based on UE category M1 with a maximum channel bandwidth of approximately 25 PRBs (corresponding to 4.5 MHz excluding guard bands and 5 MHz including guard bands) is specified to address even more demanding applications. In the FeMTC work item, Observed Time Difference of Arrival (OTDOA) improvements with respect to positioning accuracy, user equipment (UE) complexity and power consumption for these (6-PRB and 25-PRB) UEs may be considered for standardization.

Location-based services and emergency call positioning drive the development of positioning in wireless networks. Positioning support in 3GPP LTE is included in Release 9. This enables operators to retrieve position information for location-based services and to meet regulatory emergency call positioning requirements. Positioning in LTE is supported by the architecture in FIG. 1.

FIG. 1 is a block diagram illustrating the architecture of an example LTE system. In the illustrated example, direct interaction between a UE and a location server (e.g., Evolved Serving Mobile Location Centre (E-SMLC)) is via the LTE Positioning Protocol (LPP). Moreover, there are also interactions between the location server and the eNodeB via the LPPa protocol, to some extent supported by interactions between the eNodeB and the UE via the Radio Resource Control (RRC) protocol. The following positioning techniques are considered in LTE: (a) Enhanced Cell ID—cell ID information to associate the UE to the serving area of a serving cell, and then additional information to determine a finer granularity position; (b) Assisted Global Navigation Satellite System (GNSS)—GNSS information retrieved by the UE, supported by assistance information provided to the UE from E-SMLC; (c) OTDOA—a UE estimates the time difference of reference signals from different base stations and sends to the E-SMLC for multilateration; and (d) Uplink Time Difference of Arrival (UTDOA)—a UE is requested to transmit a specific waveform that is detected by multiple location measurement units (e.g., an eNB) at known positions, and the measurements are forwarded to E-SMLC for multilateration.

OTDOA is included in 3GPP release 9 as a downlink (DL) positioning method. As illustrated in FIG. 2, OTDOA in LTE is based on the device measuring the time of arrival (TOA) of signals received from eNBs.

FIG. 2 illustrates OTDOA with three network nodes and a UE. The UE measures the relative difference between the reference cell (e.g., t1 at eNB1) and another specific cell (e.g., t2 at eNB2 or t3 at eNB3), defined as reference signal time difference (RSTD) measurement. Every such RSTD determines a hyperbola, and the intersecting point of the hyperbolas represents the device position. In the illustrated example, the reference cell is selected by the device and the RSTD measurement can be performed on an intra-frequency cell (reference cell/neighbor cell are on the same carrier frequency as the serving cell) or inter-frequency cell (at least one of reference cell/neighbor cell is on the different carrier frequency from the serving cell).

OTDOA is the supported method for FeMTC UEs, and may support positioning for NB-IoT. In conventional OTDOA, the UE conducts a set of RSTD measurements as requested from the location server via LPP. The time-to fix parameter denotes the time from when a UE is configured to measure the RSTDs until the RSTD result report is sent.

SUMMARY

Particular problems exist with techniques for determining the position of narrowband Internet of Things (NB-IoT) user equipment (UEs). For example, while Observed Time Difference of Arrival (OTDOA) may be a positioning method for NB-IoT UEs, the measurements and signaling required for OTDOA adds extra overhead to these low power and low complexity devices. Computing the reference signal time difference between two cells requires processing effort for the UE. Thus, the measurement process should be minimized as much as possible to maintain the low-cost, power and complexity of these devices. This may be important in a dense cell deployment where a device could drain its battery by measuring on too many cells. Certain embodiments of the present disclosure may provide solutions to these and other problems.

Particular embodiments minimize the number of reference signal time difference (RSTD) measurements performed by the IoT-UE to enable a less costly positioning estimation procedure for NB-IoT devices. The network can assist the UE in the number of required RSTD measurements and provide a rule to determine when the device may terminate the RSTD measurement.

Some general steps performed by a UE include the following. Step 1: Receive a pre-defined/conditional rule for measurement termination together with other OTDOA assistance information including the list of reference and neighbor cells. Step 2: Perform RSTD measurement of two cells in the lists provided in Step 1. Step 3: Determine RSTD quality of the measured RSTD in Step 2. Step 4: If a termination criterion is reached according to the pre-defined rule sent in Step 1 go to 5, else go to step 2. Step 5: Report the set of RSTD measurements and their quality to the network node. Step 5.a In some embodiments, report the fulfilled termination condition.

Some general steps performed by a network node include the following. Step 1: Send a pre-defined/conditional rule for measurement termination together with other OTDOA assistance information including the list of reference and neighbor cells to the device. Step 2: Receive a set of RSTD measurements and their quality from the device.

According to some embodiments, a method for use in a wireless device of reporting positioning measurements comprises receiving network assistance information from a network node. The network assistance information is for assisting the wireless device in performing Observed Time Difference of Arrival (OTDOA). The network assistance information comprises: a list of reference cells; a list of neighbor cells; and a rule for terminating Reference Signal Time Difference (RSTD) measurements. The method further comprises performing RSTD measurement between a cell in the reference cell list and a cell in the neighbor cell list. Upon determining the RSTD measurement satisfies the rule for terminating RSTD measurements, the method further comprises reporting the RSTD measurements to the network node. Upon determining the RSTD measurement does not satisfy the rule for terminating RSTD measurements the method further comprises performing another RSTD measurement between the cell in the reference cell list and a cell in the neighbor cell list.

In particular embodiments, the rule for terminating RSTD measurements indicates terminating RSTD measurements after taking at least a pre-determined number (N) of RSTD measurements having a least a pre-determined quality (X). The pre-determined number (N) may be less than fifteen.

In particular embodiments, reporting the RSTD measurements to the network node includes reporting a quality of the RSTD measurements and/or an indication that the rule for terminating RSTD measurements was satisfied.

In particular embodiments, the rule for terminating RSTD measurements indicates terminating RSTD measurements after taking at least a first pre-determined number (N1) of RSTD measurements having a least a first pre-determined quality (X1) or at least a second pre-determined number (N2) of RSTD measurements having a least a second pre-determined quality (X2).

According to some embodiments, a wireless device is capable of reporting positioning measurements. The wireless device comprises processing circuitry operable to receive network assistance information from a network node. The network assistance information is for assisting the wireless device in performing OTDOA. The network assistance information comprises: a list of reference cells; a list of neighbor cells; and a rule for terminating RSTD measurements. The processing circuitry is further operable to perform RSTD measurement between a cell in the reference cell list and a cell in the neighbor cell list. When the processing circuitry determines the RSTD measurement satisfies the rule for terminating RSTD measurements, the processing circuitry is further operable to report the RSTD measurements to the network node. When the processing circuitry determines the RSTD measurement does not satisfy the rule for terminating RSTD measurements, the processing circuitry is further operable to perform another RSTD measurement between the cell in the reference cell list and a cell in the neighbor cell list.

In particular embodiments, the rule for terminating RSTD measurements indicates terminating RSTD measurements after taking at least a pre-determined number (N) of RSTD measurements having a least a pre-determined quality (X). The pre-determined number (N) may be less than fifteen.

In particular embodiments, the report to the network node includes a quality of the RSTD measurements and/or an indication whether the rule for terminating RSTD measurements was satisfied.

In particular embodiments, the rule for terminating RSTD measurements indicates terminating RSTD measurements after taking at least a first pre-determined number (N1) of RSTD measurements having a least a first pre-determined quality (X1) or at least a second pre-determined number (N2) of RSTD measurements having a least a second pre-determined quality (X2).

According to some embodiments, a method for use in a network node of providing network assistance for positioning measurements comprises transmitting network assistance information to a wireless device. The network assistance information is for assisting the wireless device in performing OTDOA. The network assistance information comprises: a list of reference cells; a list of neighbor cells; and a rule for terminating Reference Signal Time Difference (RSTD) measurements. The method further comprises receiving a report that provides the RSTD measurements from the wireless device.

In particular embodiments, the rule for terminating RSTD measurements indicates terminating RSTD measurements after taking at least a pre-determined number (N) of RSTD measurements having a least a pre-determined quality (X). The pre-determined number (N) may be less than fifteen.

In particular embodiments, the report includes a quality of the RSTD measurements and/or an indication that the rule for terminating RSTD measurements was satisfied.

In particular embodiments, the rule for terminating RSTD measurements indicates terminating RSTD measurements after taking at least a first pre-determined number (N1) of RSTD measurements having a least a first pre-determined quality (X1) or at least a second pre-determined number (N2) of RSTD measurements having a least a second pre-determined quality (X2).

According to some embodiments, a network node is capable of providing network assistance for positioning measurements. The network node comprises processing circuitry operable to transmit network assistance information to a wireless device. The network assistance information is for assisting the wireless device in performing OTDOA. The network assistance information comprises: a list of reference cells; a list of neighbor cells; and a rule for terminating RSTD measurements. The processing circuitry is further operable to receive a report that provides the RSTD measurements from the wireless device.

In particular embodiments, the rule for terminating RSTD measurements indicates terminating RSTD measurements after taking at least a pre-determined number (N) of RSTD measurements having a least a pre-determined quality (X). The pre-determined number (N) may be less than fifteen.

In particular embodiments, the report includes a quality of the RSTD measurements and/or an indication of whether the rule for terminating RSTD measurements was satisfied.

In particular embodiments, the rule for terminating RSTD measurements indicates terminating RSTD measurements after taking at least a first pre-determined number (N1) of RSTD measurements having a least a first pre-determined quality (X1) or at least a second pre-determined number (N2) of RSTD measurements having a least a second pre-determined quality (X2).

According to some embodiments, a wireless device is capable of reporting positioning measurements. The wireless device comprises a receiving module, a measuring module, and a reporting module. The receiving module is operable to receive network assistance information from a network node. The network assistance information is for assisting the wireless device in performing OTDOA. The network assistance information comprises: a list of reference cells; a list of neighbor cells; and a rule for terminating RSTD measurements. The measuring module is operable to perform RSTD measurement between a cell in the reference cell list and a cell in the neighbor cell list. When the processing circuitry determines the RSTD measurement satisfies the rule for terminating RSTD measurements, the reporting module is operable to report the RSTD measurements to the network node. When the processing circuitry determines the RSTD measurement does not satisfy the rule for terminating RSTD measurements, the measuring module is operable to perform another RSTD measurement between the cell in the reference cell list and a cell in the neighbor cell list.

According to some embodiments, a network node is capable of providing network assistance for positioning measurements. The network node comprises a transmitting module and a receiving module. The transmitting module is operable to transmit network assistance information to a wireless device. The network assistance information is for assisting the wireless device in performing OTDOA. The network assistance information comprises: a list of reference cells; a list of neighbor cells; and a rule for terminating RSTD measurements. The receiving module is operable to receive a report that provides the RSTD measurements from the wireless device.

Also disclosed is a computer program product. The computer program product comprises instructions stored on non-transient computer-readable media which, when executed by a processor, perform the steps of: receiving network assistance information from a network node; and performing RSTD measurement between a cell in a reference cell list and a cell in a neighbor cell list. Upon determining the RSTD measurement satisfies the rule for terminating RSTD measurements, the instructions further perform the step of reporting the RSTD measurements to the network node. Upon determining the RSTD measurement does not satisfy the rule for terminating RSTD measurements, the instructions further perform the step of performing another RSTD measurement between the cell in the reference cell list and a cell in the neighbor cell list.

Another computer program product comprises instructions stored on non-transient computer-readable media which, when executed by a processor, perform the steps of: transmitting network assistance information to a wireless device; and receiving a report that provides the RSTD measurements from the wireless device.

Certain embodiments of the present disclosure may provide one or more technical advantages. For example, some embodiments include assisting a wireless device to terminate a RSTD measurement after the wireless device performs enough measurements. An another example, an advantage of certain embodiments includes avoiding unnecessary measurements by the wireless device. As another example, a technical advantage of certain embodiments includes minimizing the processing effort and power consumption at the device side. As yet another example, a technical advantage of certain embodiments includes reducing the overall overheard of OTDOA positioning method for IoT devices. As a further example, a technical advantage of certain embodiments includes adding configurability at the location server to trade-off between positioning accuracy and IoT device power consumption, e.g., because some devices have low positioning accuracy requirements. As a final example, a technical advantage of certain embodiments includes adding the configurability to trade-off between time-to-fix and positioning accuracy, a more restrictive termination criterion will lead to a shorter time-to-fix. Certain embodiments may have none, some, or all of the recited advantages.

BRIEF DESCRIPTION OF THE DRAWINGS

For a more complete understanding of the embodiments and their features and advantages, reference is now made to the following description, taken in conjunction with the accompanying drawings, in which:

FIG. 7 is a block diagram illustrating an example embodiment of a radio network node.

DETAILED DESCRIPTION

Figure 1:
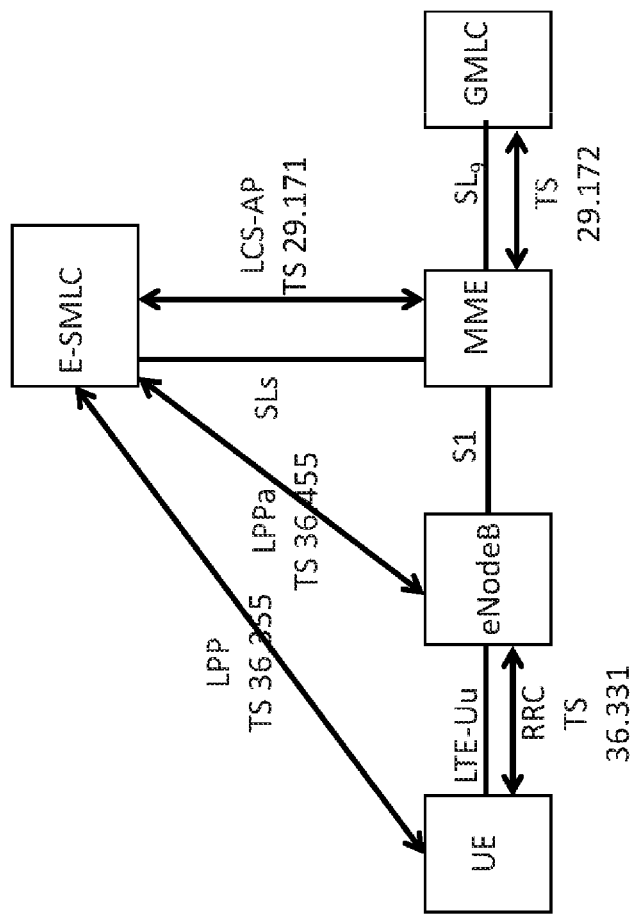
FIG. 1 is a block diagram illustrating the architecture of an example LTE system.
Figure 2:
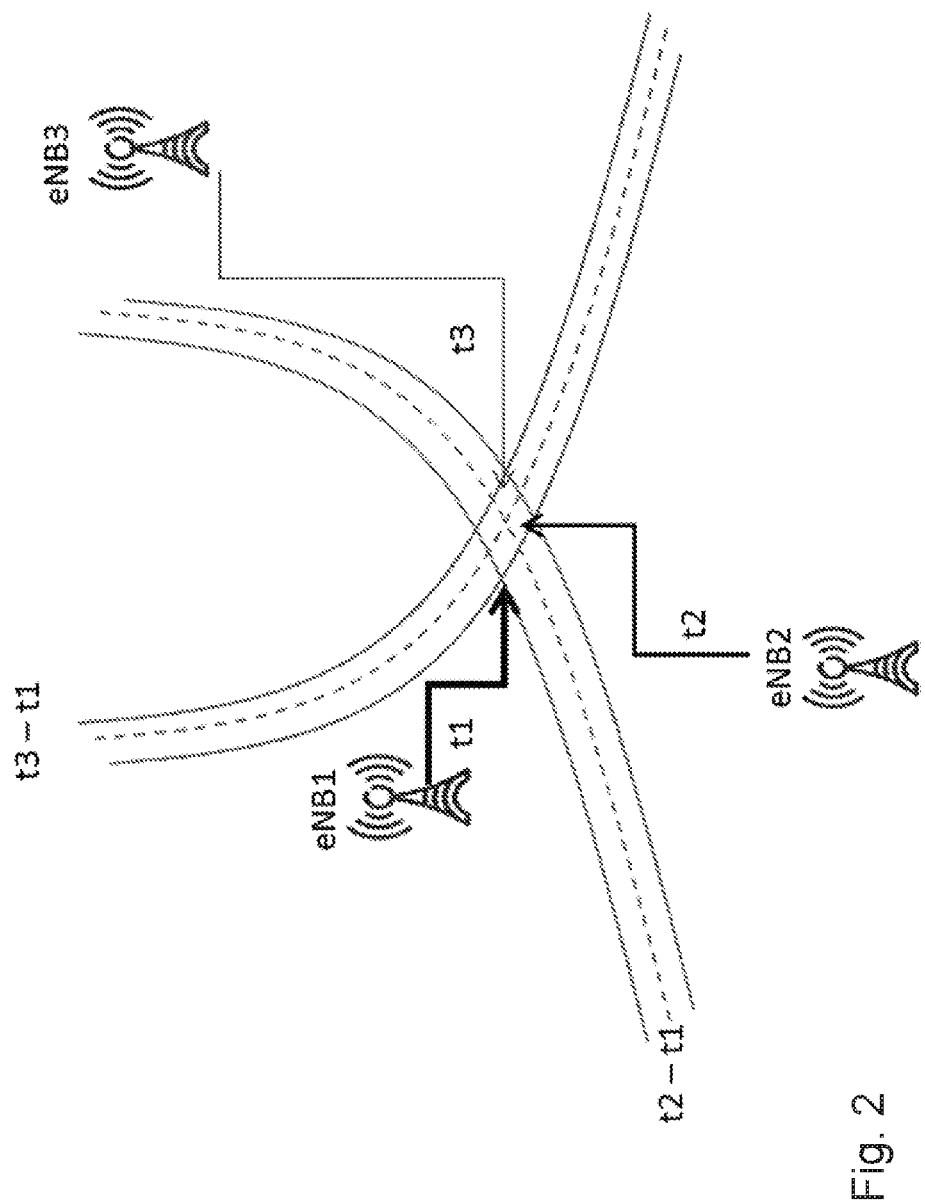
FIG. 2 illustrates OTDOA with three network nodes and a UE.

Particular embodiments disclosed herein assist Internet of Things (IoT) devices (e.g., narrowband IoT (NB-IoT) devices) to terminate a reference signal time difference (RSTD) measurement procedure early if adequate measurement is available. Assisting the IoT devices may avoid performance of unnecessary measurements by the device.

One potential advantage of using Observed Time Difference of Arrival (OTDOA) as the positioning method for IoT devices is preserving the legacy signaling procedure for these devices as it was for legacy long term evolution (LTE) user equipment (UEs). LTE uses LTE positioning protocol (LPP) signaling between an evolved-serving mobile location center (E-SMLC) to the UE, which provides OTDOA network assistance information. The signaling can be useful for IoT devices considering the limited capability and power consumption of IoT devices. Therefore, advantages may be realized reusing LTE signaling for IoT devices, and improvements may be realized by tailoring the content of the signaling to the capabilities of the IoT devices.

As an example, in certain embodiments, the network node (i.e., E-SMLC) provides the NB-IoT UE with a list of potential reference cell and neighbor cells to be used for RSTD measurements. For each of these lists, the E-SMLC provides a set of information including the physical cell ID, the global cell ID, the positioning reference signal (PRS) info, etc. The network node may also provide the expected RSTD measurement and the expected RSTD uncertainty measurement, which can be useful to the UE.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Generally, all terms used herein are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

Particular embodiments are described with reference to FIGS. 3-8B of the drawings, like numerals being used for like and corresponding parts of the various drawings. LTE and NR are used throughout this disclosure as example cellular systems, but the ideas presented herein may apply to other wireless communication systems as well.

Figure 3:
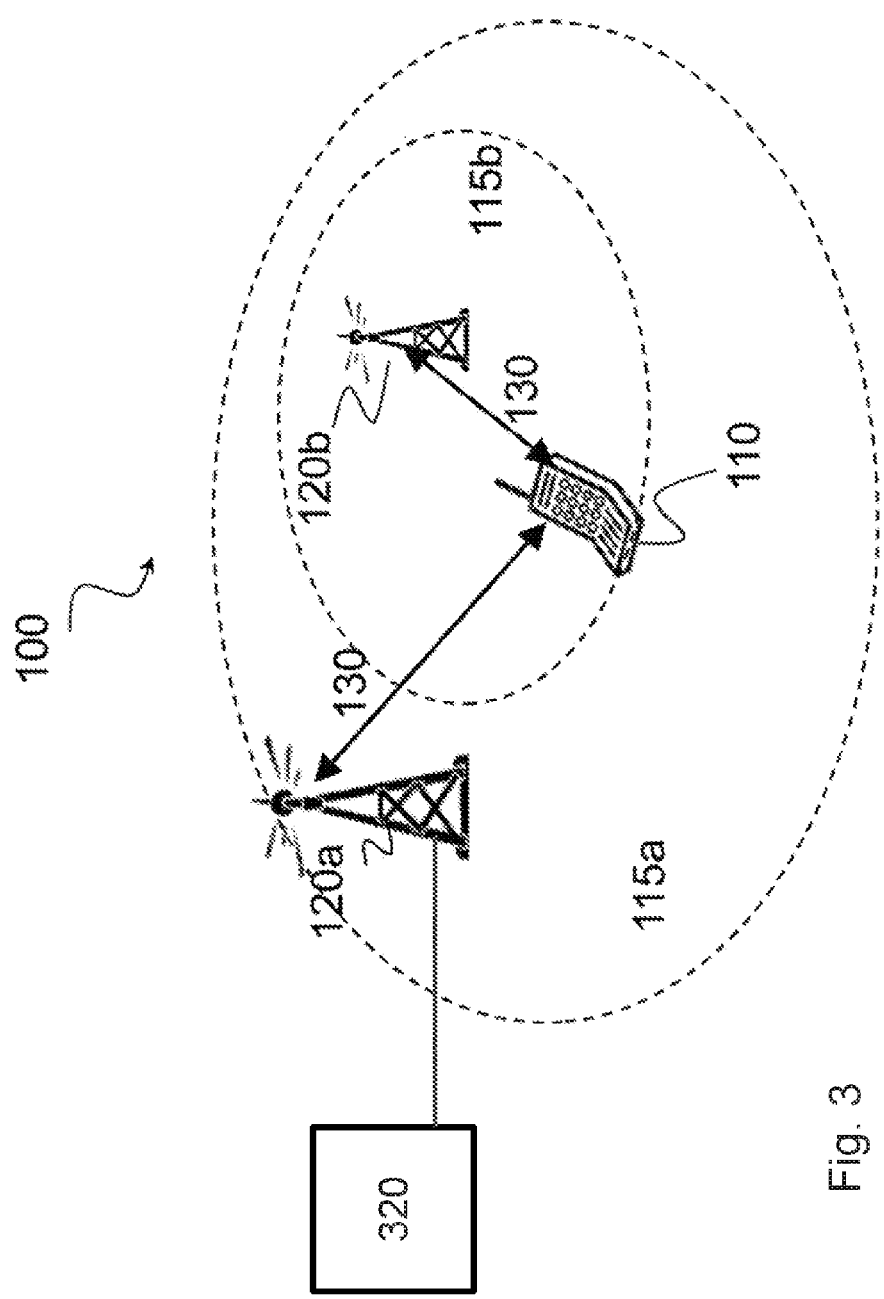
FIG. 3 is a block diagram illustrating an example wireless network, according to a particular embodiment.

FIG. 3 is a block diagram illustrating an example wireless network, according to a particular embodiment. Wireless network 100 includes one or more wireless devices 110 (such as mobile phones, smart phones, laptop computers, tablet computers, MTC devices, or any other devices that can provide wireless communication) and a plurality of network nodes 120 (such as base stations or eNodeBs) Network node 120 serves coverage area 115 (also referred to as cell 115).

In general, wireless devices 110 that are within coverage of radio network node 120 (e.g., within cell 115 served by network node 120) communicate with radio network node 120 by transmitting and receiving wireless signals 130. For example, wireless devices 110 and radio network node 120 may communicate wireless signals 130 containing voice traffic, data traffic, and/or control signals. A network node 120 communicating voice traffic, data traffic, and/or control signals to wireless device 110 may be referred to as a serving network node 120 for the wireless device 110.

In some embodiments, wireless device 110 may be referred to by the non-limiting term "UE." A UE may include any type of wireless device capable of communicating with a network node or another UE over radio signals. The UE may comprise radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), USB dongles, Customer Premises Equipment (CPE), etc.

In some embodiments, network node 120 may include any type of network node such as a base station, radio base station, base transceiver station, base station controller, network controller, evolved Node B (eNB), Node B, multi-RAT base station, Multi-cell/multicast Coordination Entity (MCE), relay node, access point, radio access point, Remote Radio Unit (RRU) Remote Radio Head (RRH), a core network node (e.g., MME, SON node, a coordinating node, etc.), or even an external node (e.g., 3rd party node, a node external to the current network), etc.

Wireless signals 130 may include both downlink transmissions (from radio network node 120 to wireless devices 110) and uplink transmissions (from wireless devices 110 to radio network node 120).

Each network node 120 may have a single transmitter or multiple transmitters for transmitting wireless signals 130 to wireless devices 110. In some embodiments, network node 120 may comprise a multi-input multi-output (MIMO) system. Similarly, each wireless device 110 may have a single receiver or multiple receivers for receiving signals 130 from network nodes 120.

Network 100 may include carrier aggregation. For example, wireless device 110 may be served by both network node 120a and 120b and communicate wireless signals 130 with both network node 120a and 120b.

In certain embodiments, network nodes 125 may interface with a radio network controller (RNC). The radio network controller may control network nodes 120 and may provide certain radio resource management functions, mobility management functions, and/or other suitable functions. In certain embodiments, the functions of the radio network controller may be included in network node 120. The radio network controller may interface with a core network node (CN), such as core network node 320.

In certain embodiments, the radio network controller may interface with core network node 320 via an interconnecting wired or wireless network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, core network node 320 may manage the establishment of communication sessions and various other functionalities for wireless devices 110. Examples of core network node 320 may include mobile switching center (MSC), mobility management entity (MME), serving gateway (SGW), packet data network gateway (PGW), operation and maintenance (O&M), operations support system (OSS), SON, positioning node (e.g., Enhanced Serving Mobile Location Center, (E-SMLC)), MDT node, etc. Wireless devices 110 may exchange certain signals with core network node 320 using the non-access stratum layer. In non-access stratum signaling, signals between wireless devices 110 and core network node 320 may be transparently passed through the radio access network. In certain embodiments, network nodes 120 may interface with one or more network nodes 120 over an internode interface, such as, for example, an X2 interface.

In particular embodiments, core network node 320 may perform positioning for a wireless device, such as wireless device 110. Core network node 320 may transmit positioning reference signals (PRS) and positioning assistance information to wireless device 110. Core network node 320 may receive positioning measurements from wireless device 110.

In some embodiments, wireless device 110 may report positioning measurements. Wireless device 110 may receive network assistance information from a network node, such as core network node 320. The network assistance information is for assisting wireless device 110 in performing OTDOA. The network assistance information comprises: a list of reference cells; a list of neighbor cells; and a rule for terminating RSTD measurements.

In some embodiments, wireless device 110 may use the network assistance information to perform RSTD measurement between a cell in the reference cell list and a cell in the neighbor cell list. When wireless device 110 determines the RSTD measurement satisfies the rule for terminating RSTD measurements, wireless device 110 may report the RSTD measurements to the network node. When wireless device 110 determines the RSTD measurement does not satisfy the rule for terminating RSTD measurements, wireless device 110 may perform another RSTD measurement between the cell in the reference cell list and a cell in the neighbor cell list.

In particular embodiments, the rule for terminating RSTD measurements indicates terminating RSTD measurements after taking at least a pre-determined number (N) of RSTD measurements having a least a pre-determined quality (X). The pre-determined number (N) may be less than fifteen.

In particular embodiments, the report to the network node includes a quality of the RSTD measurements and/or an indication whether the rule for terminating RSTD measurements was satisfied.

In particular embodiments, the rule for terminating RSTD measurements indicates terminating RSTD measurements after taking at least a first pre-determined number (N1) of RSTD measurements having a least a first pre-determined quality (X1) or at least a second pre-determined number (N2) of RSTD measurements having a least a second pre-determined quality (X2). Additional details are described below with respect to FIGS. 4 and 5.

In wireless network 100, each radio network node 120 may use any suitable radio access technology, such as long term evolution (LTE), LTE-Advanced, NR, UMTS, HSPA, GSM, cdma2000, WiMax, WiFi, and/or other suitable radio access technology. Wireless network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a wireless network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described below with respect to FIG. 6A. Similarly, a radio network node may include any suitable combination of hardware and/or software. For example, in particular embodiments, a network node, such as network node 120, may include the components described below with respect to FIG. 7. A core network node may include any suitable combination of hardware and/or software. For example, in particular embodiments, a core network node, such as core network node 320, may include the components described below with respect to FIG. 8A.

Particular embodiments include response time termination. IoT devices may aggregate a downlink reference signal (e.g., positioning reference signal (PRS)) for several/many occasions (repetitions) to achieve an acceptable positioning estimation. Aggregating the downlink reference signal impacts the response time. Thus, in particular embodiments the network node provides network assistance information to the UE. The network assistance information enables the UE to optimize performance regarding the response time. The assistance may also minimize the complexity and power consumption of the UE. In one embodiment, the legacy response time can be sub-divided into more numbers to assist the UE in prioritizing the RSTD measurement performance, meaning that the response time can be modified to also include time to measure N cells.

Some embodiments include a predefined rule for measurement termination. In conventional positioning procedures, the UE reports fifteen RSTDs assuming that the signal to interference-plus-noise ratio (SINR) is above a threshold. To further assist an NB-IoT UE, and to avoid unnecessary measurement at the UE, in particular embodiments the location server provides the UE with the option that if N RSTDs with quality X have been measured, then the UE is allowed to report the RSTD measurement, and the UE does not continue with further measurements. N and X may be configured via a measurement instruction. In some embodiments, it may be sufficient to do the positioning estimation with a fewer number of RSTDs if the RSTDs have adequate RSTD quality.

In some embodiments, a location server provides a UE with the option that if N RSTDs with quality X have been measured, then the UE is allowed to report the RSTD measurement, and the UE does not continue with further measurements. The quality of RSTD measurement (rstdQuality) may be defined based on error-Resolution, error-Value and error-NumSamples, as described in Table 1.

TABLE 1

List of higher-layer result parameters.

| Description | Symbol | Unit | Reference |
|---|---|---|---|
| Reference signal time difference measured at the UE antenna connector to be obtained in RRC_CONNECTED state (intra- and inter-frequency) and requires compensation of potential bandwidth- or band dependent group delays (LPP reporting: rstd) $\Delta t_i = t_i - T_{REF}$ Measurement range: $-16384, \ldots, 16383$ Reportable range: $-15391, \ldots, 15391$ (LPP: rstd-Quality) error-Resolution, bit string (2) Values: 5, 10, 20, 30 meters error-Value, bit string (5) Values: 0, . . . , 31 error-NumSamples, bit string (3) Value: 0 (i.e., not the baseline metrics) | $\Delta t_i$ | $T_s$ | 5.1.12 RSTD report map [1], 9.1.10.3  6.5.1.2 error = X * R to (X + 1) * R − 1 meters, where X is given by error-Value and R by error-Resolution. |

Note:
Not the baseline metrics shall be reported by which the UE can derive previous two fields based on e.g., SINR. Moreover we avoid disclosing information about how we derive the RSTD estimates.

In some embodiments, the choice of X by the location server is based on, but not limited to, the following: (a) error-Value; (b) error-Value times error-Resolution; (c) SINR; (d) cross-correlation characteristics of the estimated channels used for forming the RSTDs; and (e) an ordering rule in the neighbor list. As an example, A UE may measure SINR and the choice of N and X may be as follows: (N, X)={(12, −14 dB), (10, −13 dB), (8, −12 dB), (6, −11 dB), (5, −10 dB)}

In particular embodiments, the IoT device performs RSTD measurements based on the assistance information sent by the location server. The UE may report both the RSTD and RSTD quality to the E-SMILC. The RSTD quality is according to the estimated RSTD measurement sent by the location server. If the IoT device has terminated the RSTD measurement procedure according to one of the conditional termination criteria sent by the network as the assistance data, the IoT device can optionally report the condition used together with the RSTD measurements.

Some embodiments may include signaling support via LPP. An example is given below.

```
-- ASN1START
CommonIEsRequestLocationInformation ::= SEQUENCE {
        locationInformationType       LocationInformationType,
        triggeredReporting            TriggeredReportingCriteria       OPTIONAL, --
Cond ECID
        periodicalReporting           PeriodicalReportingCriteria      OPTIONAL, --
Need ON
        additionalInformation         AdditionalInformation            OPTIONAL, --
Need ON
        qos                           QoS                              OPTIONAL, -- Need
ON
        environment                   Environment                      OPTIONAL, --
Need ON
        locationCoordinateTypes       LocationCoordinateTypes          OPTIONAL, --
Need ON
        velocityTypes                 VelocityTypes                    OPTIONAL, --
Need ON
        ...
}
LocationInformationType ::= ENUMERATED {
        locationEstimateRequired,
        locationMeasurementsRequired,
        locationEstimatePreferred,
        locationMeasurementsPreferred,
        ...
}
PeriodicalReportingCriteria ::=          SEQUENCE {
        reportingAmount                          ENUMERATED {
                                                    ra1, ra2, ra4, ra8, ra16, ra32,
                                                    ra64, ra-Infinity
                                                 } DEFAULT ra-Infinity,
        reportingInterval                        ENUMERATED {
                                                    noPeriodicalReporting, ri0-25,
                                                    ri0-5, ri1, ri2, ri4, ri8, ri16,
ri32, ri64
                                                 }
}
```

-continued

```
TriggeredReportingCriteria ::=       SEQUENCE {
    cellchange                           BOOLEAN,
    reportingDuration                    ReportingDuration,
    ...
}
ReportingDuration ::=                INTEGER (0..255)
AdditionalInformation ::= ENUMERATED {
    onlyReturnInformationRequested,
    mayReturnAditionalInformation,
    ...
}
QoS ::= SEQUENCE {
    horizontalAccuracy       HorizontalAccuracy      OPTIONAL,  -- Need ON
    verticalCoordinateRequest BOOLEAN,
    verticalAccuracy         VerticalAccuracy        OPTIONAL,  -- Need ON
    responseTime             ResponseTime            OPTIONAL,  -- Need ON
    velocityRequest          BOOLEAN,
    [[  adequatePos-r14          AdequatePos-r14         OPTIONAL,  -- Need ON
    ]]
    ...
}
HorizontalAccuracy ::= SEQUENCE {
    accuracy      INTEGER(0..127),
    confidence    INTEGER(0..100),
    ...
}
VerticalAccuracy ::= SEQUENCE {
    accuracy      INTEGER(0..127),
    confidence    INTEGER(0..100),
    ...
}
ResponseTime ::= SEQUENCE {
    time                              INTEGER (1..128),
    ...,
            [[          responseTimeEarlyFix-r12            INTEGER
(1..128)          OPTIONAL     -- Need ON
    ]]
}
AdequatePos-r14 ::= SEQUENCE {
    minNoOfCells                     INTEGER (1..16),
    minMeasQuality                       OTDOA-MeasQuality    OPTIONAL
-- Need ON,
    ...
}
Environment ::= ENUMERATED {
    badArea,
    notBadArea,
    mixedArea,
    ...
}
-- ASN1STOP
```

Particular embodiments include methods in a wireless device and a network node. Examples are illustrated in FIGS. 4 and 5, respectively.

Figure 4:
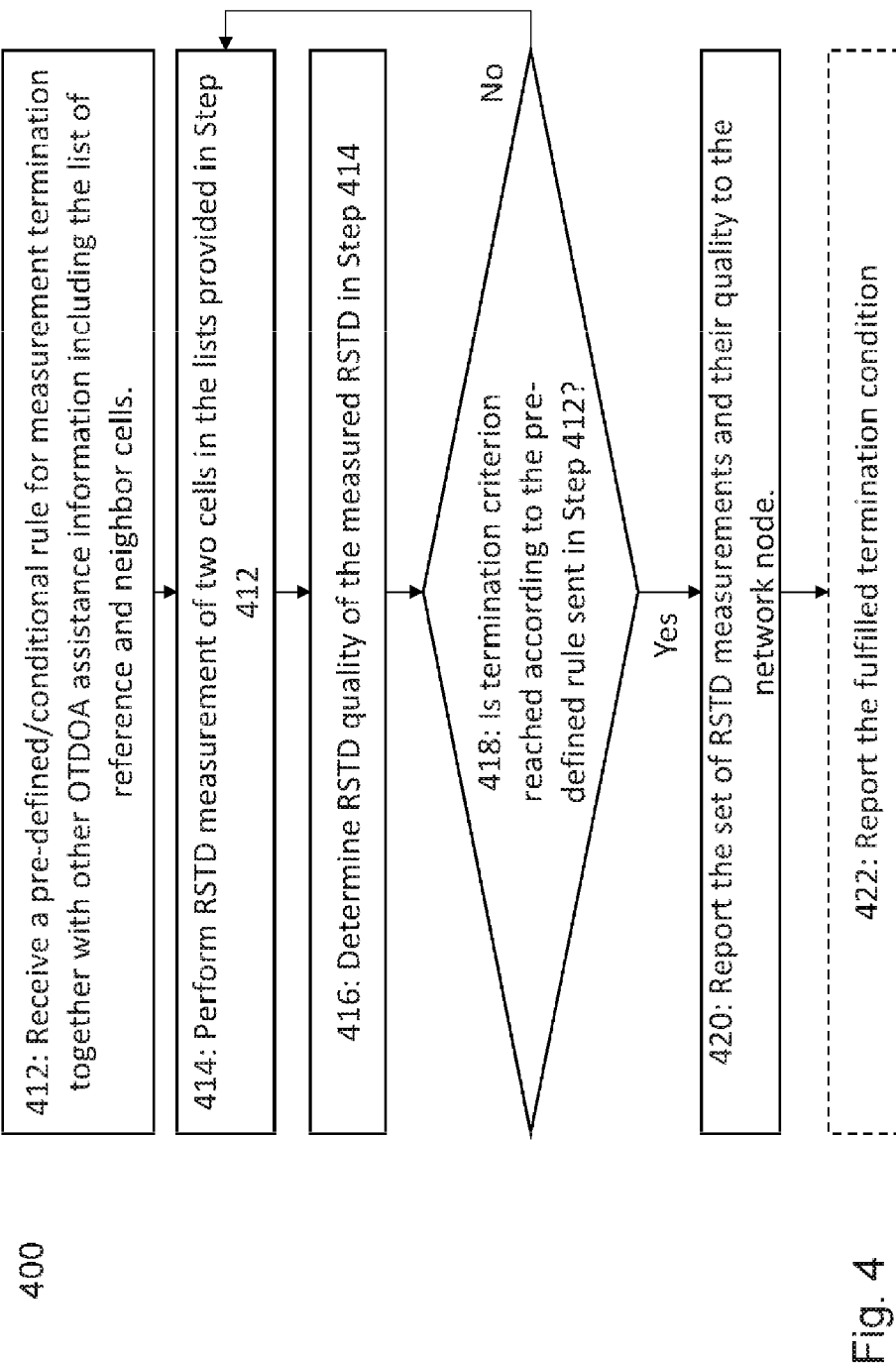
FIG. 4 is a flow diagram of an example method in a user equipment, according to some embodiments.
Figure 5:
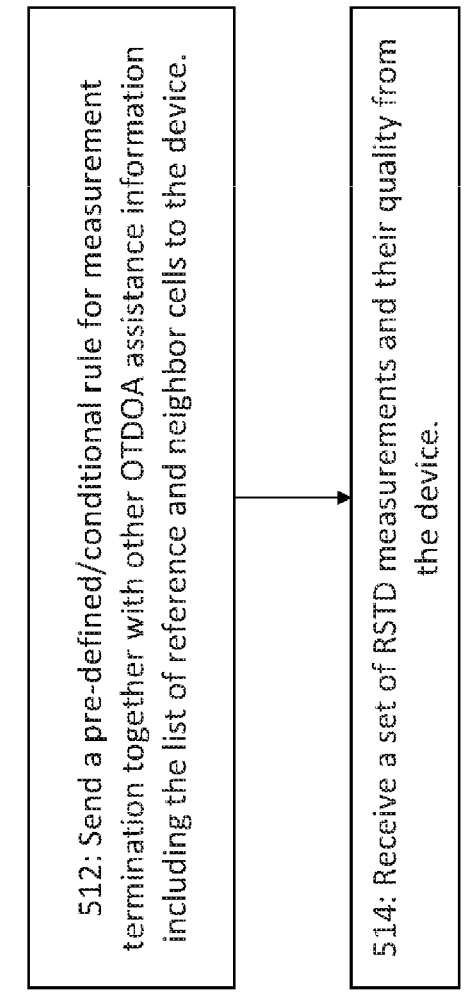
FIG. 5 is a flow diagram of an example method in a network node, according to some embodiments.

FIG. 4 is a flow diagram of an example method in a user equipment, according to some embodiments. Method 400 includes steps for reporting positioning measurements. In particular embodiments, one or more steps of FIG. 4 may be performed by wireless device 110 of wireless network 100 described with respect to FIG. 3.

The method begins at step 412, where the user equipment receives network assistance information from a network node. For example, wireless device 110 may receive network assistance information from core network node 320. The network assistance information is for assisting the wireless device in performing OTDOA.

In particular embodiments, the network assistance information comprises: a list of reference cells; a list of neighbor cells; and a rule for terminating Reference Signal Time Difference (RSTD) measurements. In some embodiments, the network assistance information includes any of the assistance information according to any of the embodiments and examples above.

At step 414, the user equipment performs RSTD measurement between a cell in the reference cell list and a cell in the neighbor cell list. For example, wireless device 110 may calculate a time of arrival (TOA) for a reference signal from a reference cell, such a cell 115*a,* and may calculate a time of arrival (TOA) for a reference signal from a neighbor cell, such as cell 115*b.* Wireless device may determine a reference signal time difference between the two measurements.

In some embodiments, the method continues to step 416, where the user equipment determines an RSTD quality of the measured RSTD. For example, wireless device 110 may measure an SINR of the reference signal as −10 dB. In some embodiments, the measurements include any of the measurements described with respect to any of the embodiments and examples above.

At step 418, the user equipment determines whether the RSTD measurement satisfies the rule for terminating RSTD measurements. For example, the rule may require three positioning measurements with an SINR above −12 dB. The UE determines whether the most recent measurement from steps 414 and 416 satisfy the rule. If so, the method continues to step 420, otherwise the method returns to step 414.

In particular embodiments, the rule for terminating RSTD measurements indicates terminating RSTD measurements after taking at least a pre-determined number (N) of RSTD measurements having a least a pre-determined quality (X). Some embodiments may include multiple criteria. For example, in some embodiments the rule for terminating RSTD measurements indicates terminating RSTD measurements after taking at least a first pre-determined number (N1) of RSTD measurements having a least a first pre-determined quality (X1) or at least a second pre-determined number (N2) of RSTD measurements having a least a second pre-determined quality (X2) (e.g., three measurements of a lower quality, or two measurements of a higher quality). In some embodiments, the determination is made according to any of the embodiments and examples above.

At step 420, the user equipment the RSTD measurements to the network node. For example, wireless device 110 may report RSTD measurements (e.g., the measurements from any previous iterations of step 414) to network node 320. Network node 320 may use the measurements for multilateration calculations in determining a position of wireless device 110. The report may include a quality of the RSTD measurements.

In some embodiments, the method includes step 422, where the user equipment also reports that the rule for terminating RSTD measurements was satisfied. For example, wireless device 110 may indicate that the measurement report is being sent early based on satisfaction of the rule, and may specify the rule used. The information may be included in Lug same report as in the previous step. In some embodiments, the report includes any suitable information according to any of the embodiments and examples above.

Modifications, additions, or omissions may be made to method 400 illustrated in FIG. 4. Additionally, one or more steps in method 400 may be performed in parallel or in any suitable order.

FIG. 5 is a flow diagram of an example method in a network node, according to some embodiments. Method 500 includes steps for providing network assistance for positioning measurements. In particular embodiments, one or more steps of FIG. 5 may be performed by network node 320 of wireless network 100 described with respect to FIG. 3.

The method begins at step 512, where the network node transmits network assistance information to a wireless device. The network assistance information is for assisting the wireless device in performing OTDOA. For example, network node 320 transmits network assistance information to wireless device 110.

In particular embodiments, the network assistance information comprises a list of reference cells, a list of neighbor cells, and a rule for terminating RSTD measurements. The assistance information may include any of the assistance information described above with respect to FIG. 4.

At step 514, the network node receives a report that provides the RSTD measurements from the wireless device. For example, network node 320 may receive a report from wireless device 110. The report may include any of the information described above with respect to FIG. 4.

Modifications, additions, or omissions may be made to method 500 illustrated in FIG. 5, Additionally, one or more steps in method 500 may be performed in parallel or in any suitable order.

Figure 6B:
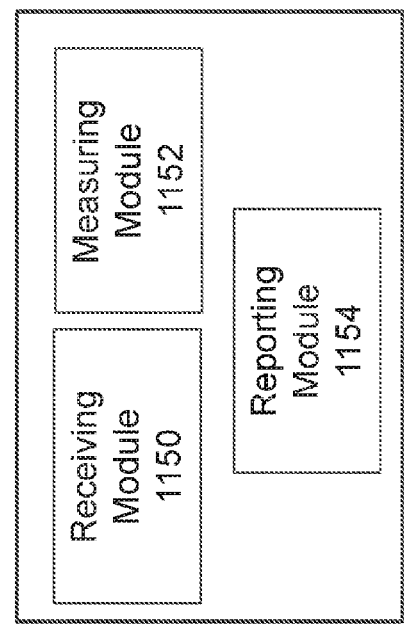
FIG. 6B is a block diagram illustrating example components of a wireless device.
Figure 6A:
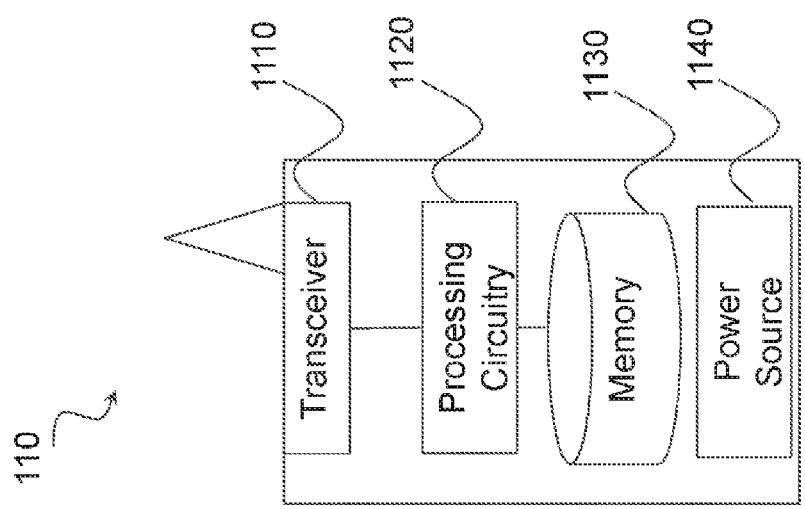
FIG. 6A is a block diagram illustrating an example embodiment of a wireless device.

FIG. 6A is a block diagram illustrating an example embodiment of a wireless device. The wireless device is an example of the wireless devices 110 illustrated in FIG. 3. In particular embodiments, the wireless device is capable of receiving network assistance information from a network node; and performing RSTD measurement between a cell in a reference cell list and a cell in a neighbor cell list. Upon determining the RSTD measurement satisfies the rule for terminating RSTD measurements, the wireless device is capable of reporting the RSTD measurements to the network node. Upon determining the RSTD measurement does not satisfy the rule for terminating RSTD measurements, the wireless device is capable of performing another RSTD measurement between the cell in the reference cell list and a cell in the neighbor cell list.

Particular examples of a wireless device include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, a vehicle-to-vehicle device, or any other device that can provide wireless communication. The wireless device includes transceiver 1110, processing circuitry 1120, memory 1130, and power source 1140. In some embodiments, transceiver 1110 facilitates transmitting wireless signals to and receiving wireless signals from wireless network node 120 (e.g., via an antenna), processing circuitry 1120 executes instructions to provide some or all of the functionality described herein as provided by the wireless device, and memory 1130 stores the instructions executed by processing circuitry 1120. Power source 1140 supplies electrical power to one or more of the components of wireless device 110, such as transceiver 1110, processing circuitry 1120, and/or memory 1130.

Processing circuitry 1120 includes any suitable combination of hardware and software implemented in one or more integrated circuits or modules to execute instructions and manipulate data to perform some or all of the described functions of the wireless device. In some embodiments, processing circuitry 1120 may include, for example, one or more computers, one more programmable logic devices, one or more central processing units (CPUs), one or more microprocessors, one or more applications, and/or other logic, and/or any suitable combination of the preceding. Processing circuitry 1120 may include analog and/or digital circuitry configured to perform some or all of the described functions of wireless device 110. For example, processing circuitry 1120 may include resistors, capacitors, inductors, transistors, diodes, and/or any other suitable circuit components.

Memory 1130 is generally operable to store computer executable code and data. Examples of memory 1130 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

Power source 1140 is generally operable to supply electrical power to the components of wireless device 110. Power source 1140 may include any suitable type of battery, such as lithium-ion, lithium-air, lithium polymer, nickel cadmium, nickel metal hydride, or any other suitable type of battery for supplying power to a wireless device.

Other embodiments of the wireless device may include additional components (beyond those shown in FIG. 6A) responsible for providing certain aspects of the wireless device's functionality, including any of the functionality described above and/or any additional functionality (including any functionality necessary to support the solution described above).

FIG. 6B is a block diagram illustrating example components of wireless device 110. The components may include receiving module 1150, measuring module 1152, and reporting module 1154.

Receiving module 1150 may perform the receiving functions of wireless device 110. For example, receiving module 1150 may receive, from a network node, network assistance information described in any of the embodiments or examples above (e.g., step 412 of FIG. 4). In certain embodiments, receiving module 1150 may include or be included in processing circuitry 1120. In particular embodiments, receiving module 1150 may communicate with measuring module 1152 and reporting module 1154.

Measuring module 1152 may perform the measuring functions of wireless device 110. For example, measuring module 1152 may measure positioning reference signals according to any of the embodiments or examples above (e.g., steps 414 and 416 of FIG. 4). In certain embodiments, measuring module 1152 may include or be included in processing circuitry 1120. In particular embodiments, measuring module 1152 may communicate with receiving module 1152 and reporting module 1154.

Reporting module 1154 may perform the reporting functions of wireless device 110. For example, reporting module 1154 may report measurement reports to a network node according to any of the examples described above (e.g., steps 420 and 422 in FIG. 4). In certain embodiments, reporting module 1154 may include or be included in processing circuitry 1120. In particular embodiments, reporting module 1154 may communicate with receiving module 1150 and measuring module 1152.

FIG. 7 is a block diagram illustrating an example embodiment of a network node. The network node is an example of the network node 120 illustrated in FIG. 3. Network node 120 can be an eNodeB, a nodeB, a base station, a wireless access point (e.g., a Wi-Fi access point), a low power node, a base transceiver station (BTS), a transmission point or node, a remote RF unit (RRU), a remote radio head (RRH), or other radio access node. The network node includes at least one transceiver 1210, at least one processing circuitry 1220, at least one memory 1230, and at least one network interface 1240. Transceiver 1210 facilitates transmitting wireless signals to and receiving wireless signals from a wireless device, such as wireless devices 110 (e.g., via an antenna); processing circuitry 1220 executes instructions to provide some or all of the functionality described above as being provided by a network node 120; memory 1230 stores the instructions executed by processing circuitry 1220; and network interface 1240 communicates signals to backend network components, such as a gateway, switch, router, Internet, Public Switched Telephone Network (PSTN), controller, and/or other network nodes 120. Processing circuitry 1220 and memory 1230 can be of the same types as described with respect to processing circuitry 1120 and memory 1130 of FIG. 6A above.

In some embodiments, network interface 1240 is communicatively coupled to processing circuitry 1220 and refers to any suitable device operable to receive input for network node 120, send output from network node 120, perform suitable processing of the input or output or both, communicate to other devices, or any combination of the preceding. Network interface 1240 includes appropriate hardware (e.g., port, modem, network interface card, etc.) and software, including protocol conversion and data processing capabilities, to communicate through a network.

Other embodiments of network node 120 include additional components (beyond those shown in FIG. 7) responsible for providing certain aspects of the network node's functionality, including any of the functionality described above and/or any additional functionality (including any functionality necessary to support the solution described above). The various different types of network nodes may include components having the same physical hardware but configured (e.g., via programming) to support different radio access technologies, or may represent partly or entirely different physical components.

Figure 8B:
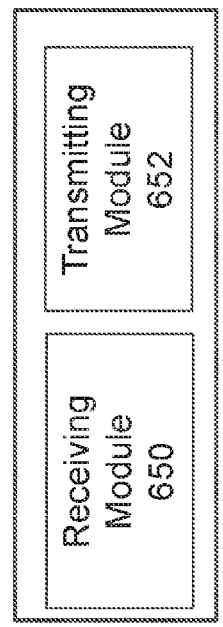
FIG. 8B is a block diagram illustrating example components of a network node.
Figure 8A:
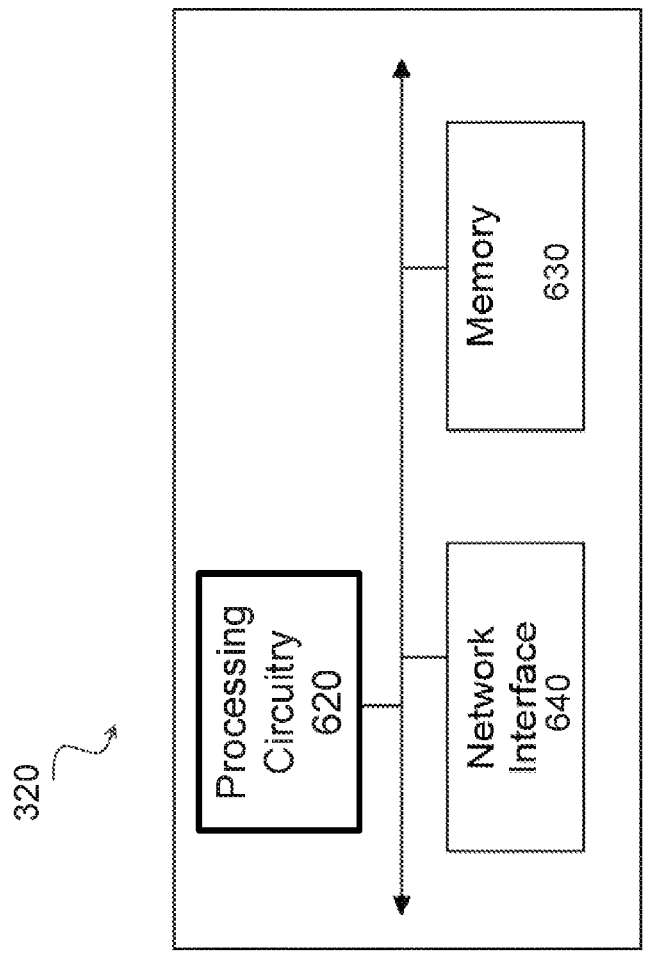
FIG. 8A is a block diagram illustrating an example embodiment of a network node.

FIG. 8A is a block schematic of an example core network node 320, in accordance with certain embodiments. In particular embodiments, the core network node is capable of transmitting network assistance information to a wireless device, and receiving a report that provides the RSTD measurements from the wireless device.

Examples of core network nodes can include an Evolved Serving Mobile Location Centre (E-SMLC), a mobile switching center (MSC), a serving GPRS support node (SGSN), a mobility management entity (MME), a radio network controller (RNC), a base station controller (BSC), an access and mobility management function (AMF), and so on. The core network node includes processing circuitry 620, memory 630, and network interface 640. In some embodiments, processing circuitry 620 executes instructions to provide some or all of the functionality described above as being provided by the network node, memory 630 stores the instructions executed by processing circuitry 620, and network interface 640 communicates signals to any suitable node, such as a gateway, switch, router, Internet, Public Switched Telephone Network (PSTN), network nodes 120, radio network controllers or core network nodes 320, etc.

Processing circuitry 620 may include any suitable combination of hardware and software implemented in one or more modules to execute instructions and manipulate data to perform some or all of the described functions of the core network node. In some embodiments, processing circuitry 620 may include, for example, one or more computers, one or more central processing units (CPUs), one or more microprocessors, one or more applications, and/or other logic.

Memory 630 is generally operable to store instructions, such as a computer program, software, an application including one or more of logic, rules, algorithms, code, tables, etc. and/or other instructions capable of being executed by a processor. Examples of memory 630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 640 is communicatively coupled to processing circuitry 620 and may refer to any suitable device operable to receive input for the network node, send output from the network node, perform suitable processing of the input or output or both, communicate to other devices, or any combination of the preceding. Network interface 640 may include appropriate hardware (e.g., port, modem, network interface card, etc.) and software, including protocol conversion and data processing capabilities, to communicate through a network.

Other embodiments of the network node may include additional components beyond those shown in FIG. 8A that may be responsible for providing certain aspects of the core network node's functionality, including any of the functionality described above and/or any additional functionality (including any functionality necessary to support the solution described above).

FIG. 8B is a block diagram illustrating example components of core network node 320. The components may include receiving module 650 and transmitting module 652.

Receiving module 650 may perform the receiving functions of core network node 320. For example, receiving module 650 may receive a measurement report as described in any of the embodiments or examples above (e.g., step 514 of FIG. 5). In certain embodiments, receiving module 650 may include or be included in processing circuitry 620. In particular embodiments, receiving module 650 may communicate with transmitting module 652.

Transmitting module 652 may perform the transmitting functions of core network node 320. For example, transmitting module 652 may send network assistance information for location measurements to a wireless device according to any of the examples described above (e.g., step 512 of FIG. 5). In certain embodiments, transmitting module 652 may include or be included in processing circuitry 620. In particular embodiments, transmitting module 652 may communicate with receiving module 650.

Some embodiments of the disclosure may provide one or more technical advantages. Some embodiments may benefit from some, none, or all of these advantages. Other technical advantages may be readily ascertained by one of ordinary skill in the art. For example, some embodiments assist a wireless device to terminate a RSTD measurement after the wireless device performs enough measurements. An another example, certain embodiments avoid unnecessary measurements by the wireless device. As another example, certain embodiments minimize the processing effort and power consumption at the device side. As yet another example, certain embodiments reduce the overall overheard of OTDOA positioning method for IoT devices. As a further example, certain embodiments add configurability at the location server to trade-off between positioning accuracy and IoT device power consumption, e.g., because some devices have low positioning accuracy requirements. As a final example, certain embodiments add the configurability to trade-off between time-to-fix and positioning accuracy, a more restrictive termination criterion will lead to a shorter time-to-fix.

Although this disclosure has been described in terms of certain embodiments, alterations and permutations of the embodiments will be apparent to those skilled in the art. Although some embodiments have been described with reference to certain radio access technologies, any suitable radio access technology (RAT) or combination of radio access technologies may be used, such as long term evolution (LTE), LTE-Advanced, NR, UMTS, HSPA, GSM, cdma2000, WiMax, WiFi, etc. Accordingly, the above description of the embodiments does not constrain this disclosure. Other changes, substitutions, and alterations are possible without departing from the spirit and scope of this disclosure.

The following examples are examples of how certain aspects of the embodiments described herein could be implemented within the framework of a specific communication standard. In particular, the following examples provide a non-limiting example of how the embodiments described herein could be implemented within the framework of a 3GPP RAN standard. The changes described by the examples are merely intended to illustrate how certain aspects of the embodiments could be implemented in a particular standard. However, the embodiments could also be implemented in other suitable manners, both in the 3GPP Specification and in other specifications or standards.

An objective of the Rel. 14 NB-IoT enhancements is to improve the positioning support based on OTDOA. In some examples, baseline signal(s) include NB-IoT Rel-13 signals and LTE CRS/PRS in 1 PRB. NB-IoT positioning reference signal resource pattern in one subframe is at least LTE PRS in 1 PRB. NB-IoT PRS do not occur in a subframe containing NPDCCH, NPDSCH, NPBCH or NPSS/NSSS. Some examples include: PSD boosting of NPRS symbols; configuration of time resources for NPRS; indication of exact subframes is by: Part A: A bitmap on subframes which are not NB-IoT DL subframes (i.e. invalid DL subframes). Bitmap is a fixed length of 10 bits, is the same length as valid subframe configuration, i.e. 10 bits or 40 bits, or is a fixed length of x bits (e.g., x=20). Part B: Indicated with one start subframe, one periodicity, and one number of repetitions for the occasions. Indication of exact subframe on an anchor carrier or non-anchor carrier may use Part A and/or Part B. An indication of NPRS muting patterns may be indicated with a periodic NPRS muting sequence.

Particular examples acknowledge the advantage of OTDOA in maintaining the current signaling and architecture as legacy, and some examples refine them for better applicability for NB-IoT.

One advantage in considering the OTDOA method as the positioning method candidate for NB-IoT is that UEs keep the legacy signaling framework procedure for these devices. Providing OTDOA network assistance information can be useful for NB-IoT devices considering the limited capability and power consumption that these devices have. However, the content of this signaling should be different and tailored to the capabilities and requirements of these UEs. Also, minimizing the size of the signaling makes it scalable to NB-IoT limited capabilities. Below are some examples of network assistance information for providing improved positioning performance for these devices.

NB-IoT UEs are expected to have very low capabilities and some minimum requirements such as the sampling rate, bandwidth, supported coverage class, etc. may already be known to the network. Therefore, it is power efficient to omit or limit the UE capability signaling for NB-IoT.

If the NB-IoT UE has some advanced capability in terms of for example "higher sampling rate" from the standard NB-IoT, the UE can inform the location server in terms of this capability to receive more tailored assistance information from the network according to the specified UE capability.

Another parameter can be the capability of supporting the inter-frequency measurement by the device, this would be also required for the network in providing assistance neighbor cell information, etc.

While there may exist more parameters that can be useful for the network to know about the UE, NB-IoT should require minimum amount of OTDOA signaling for positioning estimation.

Observation 1: NB-IoT should require minimum amount of OTDOA signaling for positioning estimation.

Proposal 1: UE capabilities can be optionally sent to the location server without any explicit request from the network for this information.

Proposal 2: UE capability in supporting inter-frequency measurement should be signaled to the location server in order to activate this feature.

Proposal 3: Inter-frequency measurements can be supported for NB-IoT UEs.

A location server (i.e. E-SMLC) may provide the NB-IoT UE with a list of potential reference cell and neighbor cells to be used for RSTD measurements. For each of these lists, the E-SMLC provides a set of information including the physical cell ID, the global cell ID and the PRS info, etc. Other information is the expected RSTD measurement and the expected RSTD uncertainty measurement, which can be useful at the UE. One parameter to be considered is that NB-IoT UEs should aggregate the downlink reference signal (e.g., PRS) for several/many occasions (repetitions), to achieve an acceptable positioning estimation. While this would also impact the response time, it is important that the network assist the UE for an optimum performance in terms of the response time. This assistance intends to minimize the complexity and power consumption at the UE side.

In the legacy procedure, the UE reports 15 RSTDs assuming that the SINR is above threshold. To further assist the NB-IoT UEs, and to avoid unnecessary measurement at the UE, the location server can provide the UE with the option that if N RSTDs with quality X have been measured, then the UE is allowed to report the RSTD measurement, and do not continue with further measurements. N & X can be configured as measurement instruction. For example, it may be sufficient to have 10 RSTDs with SINR above threshold. On the other hand, if there are 4 cells with high SINR, it is still possible to have a position estimation for the UE.

Observation 2: To avoid unnecessary measurement at the UE, the location server can provide the NB-IoT UE with more conditional time of response, and number of required RSTD measurements.

Proposal 4: The location server can provide the UE with the option that if N RSTDs with quality X have been measured, then the UE is allowed to report the RSTD measurement, and do not continue with further measurements. Example: (N, X)={(12, −14 dB), (10, −13 dB), (8, −12 dB), (6, −11 dB), (5, −10 dB)}

The NB-IoT UE performs RSTD measurements based on the assisted information sent by the E-SMLC. The UE may report both the RSTD and RSTD quality to the E-SMLC. The RSTD quality is according to the estimated RSTD measurement sent by the location server. In case the UE has terminated the RSTD measurement procedure according to one of the conditional termination criteria sent by the network as the assisted data, the NB-IoT can optionally report the condition used together with the RSTD measurements.

Proposal 5: The NB-IoT UE shall optionally report the network in terms of termination condition choice for RSTD measurement together with sending the RSTD measurements.

Abbreviations:
3GPP 3rd Generation Partnership Project
ACB Access Class Barring
AS Access Stratum
CA Carrier Aggregation
CC Component Carrier
CN Core Network
eNB Evolved Node B
eNodeB Evolved Node B
E-SMLC Evolved Serving Mobile Location Center
FeMTC Further enhanced MTC
FDD Frequency Division Duplex
GNSS Global Navigation Satellite System
ID Identifier
IoT Internet of Things
LPP LTE Positioning Protocol
LTE Long-Term Evolution
MME Mobility Management Entity
MSC Mobile Switching Center
MTC Machine Type Communication
NAS Non Access Stratum
NB-IoT NarrowBand-IoT
NR New Radio
NW Network
OTDOA Observed Time Difference of Arrival
PCC Primary Component Carrier
PCell Primary Cell
PDU Protocol Data Unit
PGW Packet Data Network Gateway
PRB Physical Resource Block
RAT Radio Access Technology
RAN Radio Access Network
RRC Radio Resource Control
RSRP Reference Signal Received Power
RSRQ Reference Signal Received Quality
RSTD Reference Signal Time Difference
SCC Secondary Component Carrier
SCell Secondary Cell
SGW Serving Gateway
SLA Service Level Agreement
SRB Signaling Radio Bearer
TDD Time Division Duplex
TDOA Time Difference Of Arrival
TOA Time Of Arrival
UE User Equipment
UMTS Universal Mobile Telecommunications System
UTDOA Uplink Time Difference of Arrival

The invention claimed is:

1. A method for use in a network node of providing network assistance for positioning measurements, the method comprising:
    transmitting network assistance information to a wireless device, the network assistance information forassisting the wireless device in performing Observed Time Difference Of Arrival (OTDOA), the network assistance information comprising:
    a list of reference cells;
    a list of neighbor cells;
    a rule for terminating Reference Signal Time Difference (RSTD) measurements; and
    receiving a report that provides the RSTD measurements from the wireless device;
    wherein the rule for terminating the RSTD measurements indicates terminating the RSTD measurements after taking at least a pre-determined number (N) of RSTD measurements having a least a pre-determined quality (X).

2. The method of claim 1, wherein the pre-determined number (N) is less than fifteen.

3. The method of claim 1, wherein the report includes a quality of the RSTD measurements.

4. The method of claim 1, wherein the report includes an indication that the rule for terminating RSTD measurements was satisfied.

5. The method of claim 1, wherein the rule for terminating RSTD measurements indicates terminating RSTD measurements after taking at least a first pre-determined number (N1) of RSTD measurements having a least a first pre-determined quality (X1) or at least a second pre-determined number (N2) of RSTD measurements having a least a second pre-determined quality (X2).

6. A network node capable of providing network assistance for positioning measurements, the network node comprising processing circuitry operable to:
   transmit network assistance information to a wireless device, the network assistance information for assisting the wireless device in performing Observed Time Difference Of Arrival (OTDOA), the network assistance information comprising:
   a list of reference cells;
   a list of neighbor cells; a rule for terminating Reference Signal Time Difference (RSTD) measurements; and
   receive a report that provides the RSTD measurements from the wireless device;
   wherein the rule for terminating the RSTD measurements indicates terminating the RSTD measurements after taking at least a pre-determined number (N) of RSTD measurements having a least a pre-determined quality (X).

7. The network node of claim 6, wherein the pre-determined number (N) is less than fifteen.

8. The network node of claim 6, wherein the report includes a quality of the RSTD measurements.

9. The network node of claim 6, wherein the report includes an indication of whether the rule for terminating RSTD measurements was satisfied.

10. The network node of claim 6, wherein the rule for terminating RSTD measurements indicates terminating RSTD measurements after taking at least a first pre-determined number (N1) of RSTD measurements having a least a first pre-determined quality (X1) or at least a second pre-determined number (N2) of RSTD measurements having a least a second pre-determined quality (X2).

* * * * *